United States Patent
Javitt et al.

[11] Patent Number: 6,111,503
[45] Date of Patent: Aug. 29, 2000

[54] INTEGRATED PROXIMITY DETECTOR FOR ANTENNAS

[75] Inventors: Joel I. Javitt, Hillside; Matthew J. Sherman, Succasunna, both of N.J.

[73] Assignee: AT&T Corp., New York, N.Y.

[21] Appl. No.: 09/223,467

[22] Filed: Dec. 30, 1998

[51] Int. Cl.⁷ .......................... G08B 13/18; G08B 21/00; G08B 21/02

[52] U.S. Cl. ...................... 340/552; 340/540; 340/573.4; 340/600; 340/635

[58] Field of Search ................. 340/552, 573.4, 340/600, 635, 540

[56] References Cited

U.S. PATENT DOCUMENTS

| | | | |
|---|---|---|---|
| 3,163,861 | 12/1964 | Suter | 340/552 |
| 3,932,871 | 1/1976 | Foote | 340/552 |
| 4,242,669 | 12/1980 | Crick | 340/552 |
| 4,673,935 | 6/1987 | Spencer | 340/552 |
| 4,910,464 | 3/1990 | Trett et al. | 340/552 |

*Primary Examiner*—Glenn Swann

[57] ABSTRACT

A method and apparatus for detecting the presence of objects such as persons in front of a high-frequency communications antenna comprising a transmitting element connected to a circulator. The circulator is connected to an antenna system which transmits the signal pursuant to a designated communications or other application. The circulator is also connected to a regulator circuit which measures a reflected signal received from the circulator. The regulator circuit thereupon initiates a reduction or termination in power from the transmitting element, and/or initiates an alarm, when the regulator circuit detects a reflected signal having a magnitude indicating the presence of the object to be detected.

33 Claims, 3 Drawing Sheets

6,111,503

INTEGRATED PROXIMITY DETECTOR FOR ANTENNAS

BACKGROUND OF THE INVENTION

The present invention relates to the field of communications. More particularly, the invention relates to an RF safety-conscious high-gain antenna communications system. However, the invention could also be applied in other fields such as navigation where similar high-gain antenna systems are used.

High-gain communication systems are utilized for a wide variety of applications, including, for example, satellite communications, terrestrial wireless networks, microwave dishes, and other point-to-point or multipoint operations. These applications all involve the use of a high-frequency antenna system. It frequently becomes necessary for users or maintenance personnel to service the transmitting antenna. Exposure to the high-powered signal can be undesirable for these persons. Thus, some protective mechanism may be helpful in these situations. In other instances, people may stray in front of the antenna face, particularly if these systems are deployed in homes. It may be desirable to detect the presence of these persons, both to reduce power to the system and to prevent trespassing.

These events give rise to the problems addressed by the present invention—reducing exposure of maintenance personnel and other persons who stray too close to the antenna, to RF transmissions, and, alternatively, providing a means to alert the system controller to the presence of intruders.

While microwave proximity detectors are well known in the art, use of these systems would employ at least two independent RF sources. One RF source is used to transmit the high-gain signal for the intended communications application. The other RF source is used to detect the presence of foreign objects in front of the communications antenna. The second RF source emits a signal in the direction of the communications antenna's line-of-sight while concurrently monitoring the presence of any reflected energy which would indicate some obstruction.

Drawbacks accompany this approach. For example, the use of two RF sources to implement the safety/security mechanism requires the expenditure of additional energy to run the communications system. Further, each RF source is associated with its own independent circuit elements such as circulators, antennas, isolators, mixers, etc. The maintenance of two RF sources and their associated components is therefore required, rendering this approach less efficient and compact. Still another problem with this method is that the second RF source can potentially interfere with the signal transmitted by the first RF source, thereby injecting unnecessary electrical noise into the transmitted communications signal. The second RF source may also interfere with an ordinary communications signal which is received by the main antenna. And, there is also the additional cost of the second RF source. In light of these drawbacks, it is desirable to implement a communications system which integrates a proximity detector without the addition of a second RF source.

Accordingly, it is an object of the invention to implement, in a system using a single RF source, a safety or security mechanism for reducing or terminating power to a high-gain antenna, or for initiating a security function, when objects are detected in front of the antenna.

Another object of the invention is to create a more compact and robust proximity detector which uses fewer structures and components.

Another object of the invention is to implement a proximity detector designed to facilitate communications with minimal interference from extraneous electrical sources.

Another object of the invention is implement a proximity detector having a single RF source and capable of detecting objects located in a designated range and/or traveling at a specified velocity.

SUMMARY OF THE INVENTION

These and other objects of the invention are accomplished in accordance with the principles of the invention by providing a method and apparatus for detecting the presence of moving and/or stationary objects such as persons in the proximity of a transmitting antenna. A transmitter drives a high-frequency communications signal into a first port of a circulator. The signal is output at a second port of the circulator and, after passing through any necessary filtering or signal-processing elements, the signal is input into a communications antenna which transmits the signal pursuant to a designated communications application.

In accordance with properties of electromagnetic waves, a portion of the transmitted communication signal reflects off of an obstructing object and back into the antenna. The reflected signal passes through the second port of the circulator and is output at a third port, where it is input into a regulator circuit. This regulator circuit includes a signal detection circuit which measures one or more properties of the reflected signal. The detection circuit may include or be prefaced by one or more filters to selectively pass various magnitudes, frequencies or DC components of the signal. Reflected signals which reside at or above some designated threshold magnitude (or remain at some magnitude for some predetermined time) are associated by the detector with the presence of an object, such as a person, within a certain proximity to the antenna. The regulator circuit also includes a control logic circuit which, based on the presence of a reflected signal of sufficient magnitude, implements an appropriate reduction or termination in transmitter power. Alternatively, where a trespasser is detected, the control logic circuit initiates a security function such as an alarm.

From the above method and apparatus for detecting objects near a transmitting antenna, numerous embodiments and variations may be contemplated. These embodiments and variations remain within the spirit and scope of the invention. Still further features of the invention and various advantages will be more apparent from the accompanying drawings and the following detailed description of the preferred embodiments.

DESCRIPTION OF THE PREFERRED EMBODIMENTS

Figure 1:
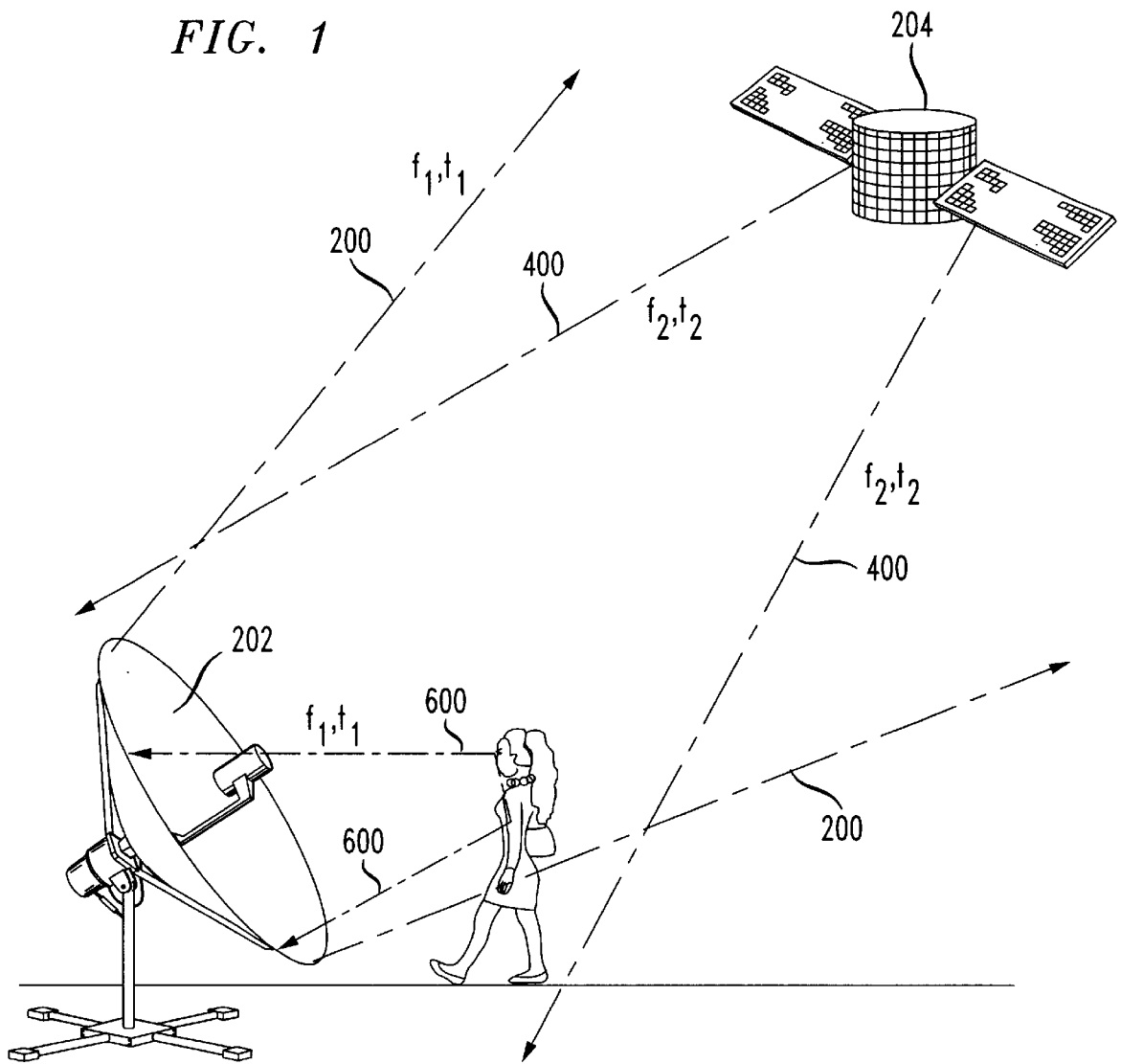
FIG. 1 shows an exemplary satellite communication system.

FIG. 1 shows an exemplary satellite communication system in which the present invention finds utility. FIG. 1 is intended for illustrative purposes only; the invention can be applied to a wide variety of wireless communications methodologies and applications (wireless networks, cellular towers, etc.). A fixed communications antenna 202 transmits a high-frequency signal defined by lines marked 200 ("signal 200"), having a center frequency f1, and transmitted in time slot t1. Signal 200 is received in space by orbiting satellite 204. Satellite 204 transmits in time slot t2 an appropriate response signal defined by lines marked 400 ("signal 400") and having a center frequency f2. In a frequency domain duplex ("FDD") system, the frequencies f1 and f2 are distinct frequencies, and t1 may (but need not) represent the same time slot as t2. In such a system, antenna 202 recognizes signal 400 having center frequency f2 as a signal transmitted from satellite 204.

When a person walks into the line-of-sight of antenna 202, a portion of the transmitted signal 200 strikes the person and reflects back into antenna 202. This reflected signal is defined by lines 600 ("signal 600"). The frequency f1 of the reflected signal 600 is nominally equal to the frequency f1 of the transmitted signal 200. Therefore, the fixed communication system can advantageously distinguish between received communication signals (at frequency f2) and signals resulting from an obstructing object in the antenna 202's line-of-sight (at frequency f1).

In a time-division-duplex ("TDD") system, the center frequencies of f1 and f2 may be the same; however, the transmitted and received signals are transmitted in different time slots t1 and t2 (or in different portions of a single time slot). In this event, a reflected signal 600 can exist only in the time slot t1 where the antenna 202 is transmitting. Thus, in the course of normal operation, a signal received by antenna 202 in time slot t1 is recognized as a reflected signal 600. Conversely, a signal received by antenna 202 in time slot t2 is understood to be a communication signal from satellite 204.

Many other variations of time-division multiplexing and frequency-division multiplexing exist in modern wireless communications. The invention can also be applied to distinct methodologies such as code-division multiple access ("CDMA"), which includes, for example, the transmission and reception of direct-sequence and frequency-hopped spread spectrum signals. The receiving system connected to antenna 202 may utilize correlators for distinguishing between spread spectrum signals having distinct codes. In this manner, a received spread spectrum signal from a remote source can be distinguished from reflected energy due to an interfering object.

Figure 2:
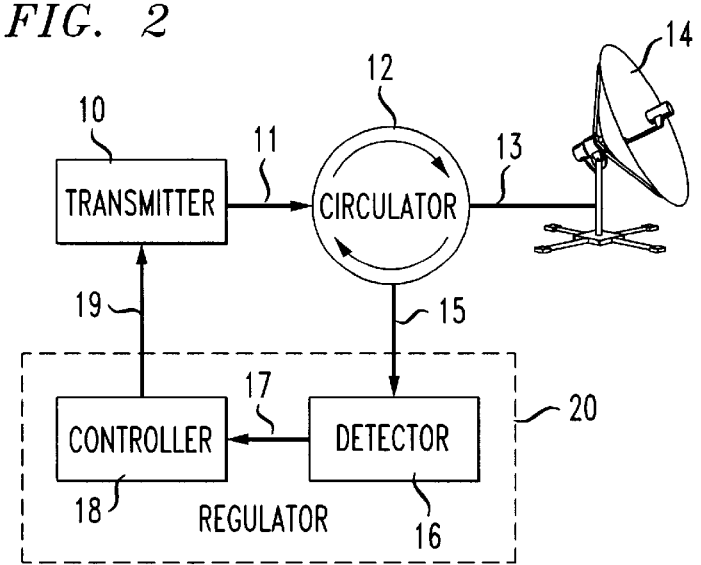
FIG. 2 shows a schematic diagram of a proximity detector in accordance with the present invention.

FIG. 2 shows a proximity detector in accordance with the invention. The proximity detector senses the presence of objects in the proximity of a transmitting antenna, and responds by implementing safety or security procedures where appropriate. A typical satellite antenna application involves the propagation of a high-frequency signal from a high-gain antenna. The signal frequency may include any high-frequency band such as KA, PCS, etc. The signal may be in any format suitable for the particular communications application (e.g., baseband signal, FM, spread spectrum, etc.). A transmitter 10 generates the signal at output 11. The transmitter 10 may include a power amplifier (not shown) to drive the high-gain signal. Alternatively, the power amplifier may be a separate device from the transmitting element itself (see, e.g., FIG. 3).

The transmitted communications signal is input into a circulator 12. A circulator is a multi-port device capable of transferring energy between its ports. A circulator can also simultaneously receive and transmit independent signals at a single port. As an illustration, a three-port circulator receives a signal at a first port and transmits the signal at a second port. If a second signal is concurrently input into the second port, the second signal is transmitted at the third port, and so on. The circulator selected must have sufficient isolation t support detecting objects of desired size at the desired range. Many suitable circulators exist, MA-COM's 3-Port cellular circulator for wireless applications compatible with 367 to 500 MHZ devices represents is an example of a workable circulator for some embodiments operating within this frequency range.

In FIG. 2, circulator 12 receives the signal at port 11 and transmits the signal at port 13. The signal is next fed into the antenna system 14 and transmitted to a satellite or other receiving device. Antenna system 14 includes a high-gain antenna for transmitting the communication signal. Preferably, antenna system 14 also includes filtering elements for rejecting noise as well as other signal processing circuitry suitable for the communications application.

Where an object such as a person enters the line-of-sight of the antenna 14, a portion of the communications signal reflects off the person and is received by antenna 14. Thereupon, the signal reenters the circulator at node 13 and is output at node 15. The signal is input into a detector 16 which measures properties of the reflected signal (e.g., average power, duration, etc.). The specific properties measured depend on the type of signal detector used. For simplicity, we generally refer to the value, or collective values, of these properties as the reflected signal's magnitude. More specifically, we define the magnitude of the reflected signal to be one or more measured values of whatever signal properties are evaluated by the particular signal detector to detect objects.

Typically, one or more threshold numerical values for these properties (e.g. power in watts) are predetermined to correspond to the presence of a sufficiently large or close object in front of the antenna. Where the magnitude of the reflected signal meets or exceeds these one or more values, detector 16 alerts control logic device 18 by outputting at node 17 a change-of-state signal reflecting the detection. Node 17 is connected to the input of control circuit 18. Based on the change-of-state signal at node 17, control circuit 18 outputs the control signals at node 19 necessary to reduce or terminate power of the transmitter 10 (or the power amplifier). In another embodiment used for security purposes, the control circuit 18 additionally (or alternatively) triggers the initiation of a security feature such as an alarm. In another embodiment the system notifies the user of the terminal or a telecommunication element management system that the signal has been interrupted by an object in front of the antenna.

The control circuit 18 and signal detector 16 may collectively be referred to in FIG. 2 as regulator circuit 20. Regulator circuit 20 may embody control circuit 18 and detector 16 as two discreet devices. Alternatively, the circuit elements which implement the functions of control circuit 18 and detector 16 may be housed within the same device. In either event, regulator circuit 20 performs both the signal detection function and outputs the necessary control signals to transmitter 10 when an obstructing object is pinpointed.

Figure 3:
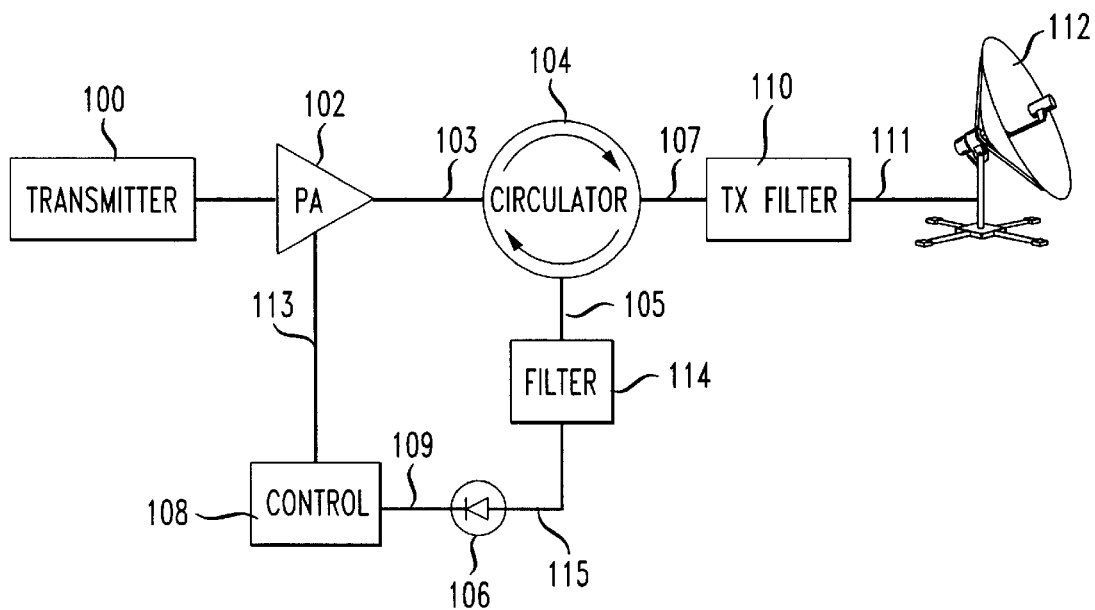
FIG. 3 shows a schematic diagram of a proximity detector in accordance with another embodiment of the present invention.

FIG. 3 shows a preferred embodiment of a proximity detector in accordance with the invention. A power amplifier (PA) 102 receives a signal from a transmitting element 100. While the power amplifier 102 and transmitter 100 are shown as separate elements in FIG. 3, it should be understood that they may in some embodiments be contained within a single device. Power amplifier 102 amplifies the signal to a power level required to drive the high-gain antenna 112. Any suitable power amplifier will suffice for the purposes of this invention; however, a traveling wave tube amplifier such as one manufactured by Watkins Johnson may be suitable for certain embodiments. The high-frequency signal is then input via port 103 into circulator 104. In FIG. 3, a three-port circulator is illustrated. The signal input at a first port (103) of the circulator 104 is transferred and output through the circulator's second port (107). The signal at port 107 is input into transmit (TX) filter 110. Transmit filter 110 processes the signal for use on the high-gain antenna 112. The specific purpose of transmit filter 110 is to reject spurious or out-of-band frequency emissions generated by power amplifier 102. The signal is output at node 111 and input into the high-gain antenna 112. The antenna 112 transmits the signal for use in whatever communications application is being employed (e.g., to communicate with an orbiting satellite).

When a foreign object appears in the line of sight of the antenna, a portion of the transmitted signal reflects back into the antenna 112. The reflected signal passes through transmit filter 110 and enters port 107 of circulator 104. In accordance with the characteristics of the circulator, the reflected signal is output at port 105.

The signal next passes through an optional filter 114 (see below) and is output at node 115. The signal is input into signal detector circuit 106. In a preferred embodiment, signal detector 106 is a standard diode detector which measures the reflected signal's power. Upon measuring the signal power, diode detector 106 outputs a resulting signal to control logic circuit 108 which, based on the presence of sufficient signal power, adjusts or terminates operation of power amplifier 102. In some embodiments control logic circuit 108 is instead directly connected to transmitting element 100.

The proximity detector described above can also be used to detect the presence of unauthorized persons. For this alternative embodiment the detector may function as described above, except that control logic circuit 108 triggers an alarm signal instead of, or in addition to, reducing power from amplifier 102.

Filter 114 may be used for differentiating between received communications signals (e.g., from a satellite) and energy reflected from interfering objects. As an illustration, in a preferred embodiment using a frequency domain duplex (FDD) methodology, the communications signal emitted from transmitting element 100 resides in a first frequency band, whereas a communications signal transmitted by the remote satellite resides in a second, known frequency band. The purpose of filter 114 is to ensure that signals received from the transmitting satellite are not interpreted as reflected energy indicating the presence of an object in antenna 112's line-of-sight. Thus, filter 114 is preferably a band-pass filter which rejects the frequency bands associated with the communication signal received from the satellite. Filter 114 passes only the frequency band associated with the signal generated from transmitting element 100. In this manner, only reflected signals indicating some obstruction will pass through filter 114 for further processing. Conversely, signals received by the transmitting satellite in the ordinary course of communications will be rejected by filter 114. These signals can instead be fed into a receiver after being output at node 105. In some FDD embodiments, the transmit filter 110 may provide sufficient rejection of received signals that filter 114 is unnecessary.

The use of filter 114 in an FDD methodology is merely one possible technique for preventing a received communications signal from being interpreted as reflected energy from an obstructing entity. In a time-division-duplex (TDD) methodology, for example, the frequencies emitted by transmitting element 100 and the remote communicating device are identical. In this case, a timing gage may be implemented which permits signal detector 106 to operate only during the time when power amplifier 102 transmits a communications signal (i.e., the satellite or signal receiving device is listening rather than transmitting). Thus, any signal entering into detector 106 is necessarily reflected energy from the transmitted communications signal. Conversely, the timing gage terminates operation of the detector when power amplifier 102 is not transmitting, thereby providing a means to receive a signal from a remote transmitting device without falsely detecting an obstructing entity in front of antenna 112. Still other detection methods can be contemplated for differentiating between received communications signals and reflected energy.

Figure 4:
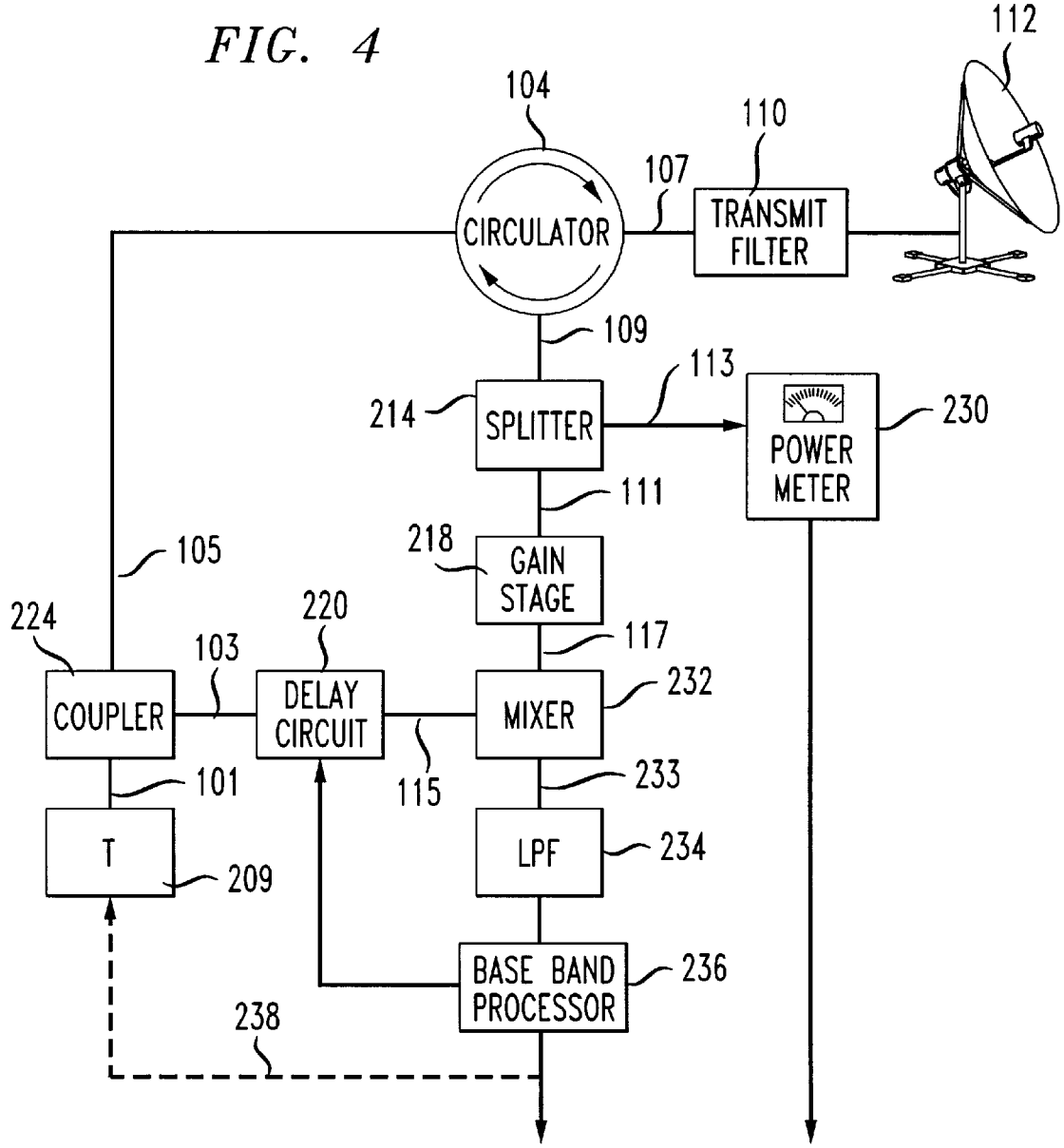
FIG. 4 shows a schematic diagram of a proximity detector in accordance with another embodiment of the present invention.

FIG. 4 shows an alternative embodiment of the proximity detector according to the invention. This device detects the presence of interfering objects like in FIG. 3. However, the device shown in FIG. 4 also measures the distance of the objects to the antenna system. The device's capability to determine distance provides numerous advantages. For example, the system in FIG. 4 can be used to selectively reduce or terminate antenna power as a function of an object's distance to the antenna. This feature can, in turn, be used to maintain compliance with various regulations promulgated by agencies such as the FCC. As an illustration, a regulation may decree that persons can stand 20 feet from a transmitting antenna emitting a given signal power, but that persons are prohibited from standing 10 feet or less from the same antenna. In this case, the device can be designed to compute distance information to selectively terminate antenna power only when it detects persons standing 10 feet or less from the antenna.

Still other regulations may dictate a time limit over which it is impermissible to allow persons to remain in front of a transmitting antenna having some threshold signal power. Thus, in another embodiment, the proximity detector includes a timer which records the time in which a person remains exposed to a transmitting signal. When the timer reaches a designated maximum, the detector reduces or terminates power to the transmitting antenna, thereby preserving compliance with the applicable regulations.

In FIG. 4, a transmitter 209 outputs a high-frequency communications signal at node 101. Transmitter 209 may include a power amplifier to drive the high-gain signal. The signal is input to a coupler 224, which splits off a small portion of the transmitted signal to node 103. The split-off portion of the signal is used to drive a variable delay line 220 (discussed below). The remaining signal (which constitutes most of the power from the originating communications signal) is output at node 105. Exemplary couplers include Mini-Circuits' line of broadband directional couplers, which has couplers in the 6 to 30 DB range. In a preferred embodiment a 20 DB coupler is used to split the signal, in which case the signal output at node 103 is 20 DB below the level of the signal output at node 105. Thus, where a 20 DB coupler is used, the signal at node 103 represents only about 1 percent of the total signal input to the coupler, with the remaining 99% of the signal power transmitted at node 105.

In other embodiments, the coupler may be located at different locations in the circuit, such as between a preamplifier stage and a final amplifier stage (both internal to transmitter 209).

The signal enters the circulator port (105) and is transmitted at port 107. The signal is appropriately filtered via transmit filter 110 and sent to antenna 112, where it is transmitted pursuant to the designated communications application. Communications may continue as in the ordinary course until an object, such as a person, interferes with antenna 112's line-of-sight. When this occurs, the transmitted signal reflects off the object and back into the antenna 112 as in the previous embodiments. The size of the object, the proximity of the object to antenna 112, and the angle at which the object is positioned before antenna 112 naturally all affect the magnitude of the reflected signal. Thus, objects which are larger, closer and more directly in front of antenna 112 tend to cast back stronger reflected signals into antenna 112. These signals are received by antenna 112 and pass back through filter 110 to port 107 of circulator 104. Pursuant to the circulator's energy-transferring properties, the reflected signal is output at port 109 and is thereupon input into splitter 214. Splitter 214 segments the signal into two discreet signals. One signal is output at node 111, and the other is output at node 113. The proportionate strength of the two signals will vary depending on the type of splitter used. Exemplary power splitters include Mini-Circuit's ZESC, ZFCS, ZAPD, and ZMSC lines which, among other things, accommodates a wide range of different operating frequencies (e.g., MHZ and GHz). In a preferred embodiment, splitter 214 is a 50/50 splitter and thus the signals at nodes 111 and 113 have substantially similar characteristics when driving approximately equivalent loads.

The signal at node 113 establishes the presence of an object in front of antenna 112. Specifically, the power contained in this signal may be measured to detect the object. Again, various methods exist to perform this measurement. This signal may, as in this embodiment, be input into a power meter 230. The purpose of power meter 230 is to detect objects in the proximity of antenna 112 based on the power level of the reflected signal. Power meter 230 implements this detection procedure by analyzing properties of the received signal (node 113) such as average voltage amplitude.

While any suitable power meter will suffice for the purposes of the invention, a preferred embodiment includes a diode rectifier followed by a low-pass filter. Diode rectifier receives a reflected signal which may oscillate between positive and negative voltages. The reflected signal is rectified such that negative voltage values are removed. The signal then passes through a low-pass filter, where only the DC component and/or low frequency components of the signal pass through. Thus the signal at the output of the low-pass filter is either a DC signal or a low frequency rectified signal whose voltage magnitude may be measured using standard volt-meter procedures. Voltage measurements above a certain threshold value are associated with objects in the proximity of the antenna.

Another embodiment of the power meter may include a resistor attached to a thermometer device to measure heat produced by current flowing through the resistor. Here, a measured temperature increasing above an ambient threshold denotes the existence of a reflected signal.

It may also be suitable in FDD applications to place a band-pass filter (not shown) at the input of power meter 230 input (node 113) to prevent the false triggering of power meter 230 due to a received communication signal from a remote communicating device. In other embodiments the power meter may be omitted.

The other signal segmented by splitter 214 and output at node 111 may in some applications pass through a gain stage 218. This signal is then output at node 117 and input into mixer 232. The function of mixer 232 is to mix a time-delayed version of the originally transmitted signal at node 115 with the reflected signal segment at node 117. This mixed signal (output at node 233) can be used to determine both the speed of motion of the interfering object and the distance of the object to antenna 112. Specifically, the mixture of the transmitted and reflected signals produces a signal whose frequency is equal to the difference between the frequencies of the transmitted and reflected signals. The size of this frequency shift, in turn, is proportional to the speed of the detected object.

As stated above, the segmented signal at the output of the coupler 224 (node 103) is input into a variable delay line 220. Delay line 220 is used in conjunction with mixer 232 and other circuitry to pinpoint the distance of the interfering object to antenna 112. One manner of computing distance using this technique involves varying the time delay associated with delay line 220. In particular, the distance can be pinpointed when a high-frequency signal (i.e., high bit rate for direct-sequence spread spectrum signals ("DSSS"), high baud rate for non-DSSS) is transmitted by selecting the value of the time-delay on delay line 220 to correspond with objects located within a certain range of the antenna. Preferably, this time delay is adjusted by a control processor to select the desired range. The signal on the delay line is correlated with the reflected signal. The time delay associated with maximum correlation of this high-frequency signal is measured and recorded. The round-trip distance from the antenna to the object can then be calculated via the familiar equation $$<distance> = <rate> \times <time>$$

where the rate is the speed of light and time is the measured time delay associated with maximum correlation of the high-frequency signal. A mixer 232 is preferably used, and, in some embodiments, a low pass filter 234 and a base-band processor 236 (discussed below) accomplishes this measurement. A mixer can also perform the correlation function associated with the object-to-antenna distance determination.

An alternative embodiment to the delay line is to insert coupler 224 into transmitter 209 prior to the application of the modulation signal, then to delay and reapply the modulation signal using digital delay. For short distances and slow speed modulation the delay line may be omitted.

In a preferred embodiment, the mixed broadband signal is also input into filter 234. Filter 234 preferably includes a Nyquist filter which reduces the bandwidth of the signal to prevent aliasing (i.e., to enable the base-band processor to sample the signal at greater than twice its highest frequency). Filter 234 may also be implemented by a band-pass filter. In this case, the higher frequency cutoff of the band-pass filter performs the anti-aliasing function, and the lower frequency cutoff eliminates the DC component of the signal to enhance dynamic range (i.e., DC-block filtering).

Filter 234 is followed by a base-band processor 236. Processor 236 may be used to detect various types of motion for obstructing objects as a function of different distances from antenna 112. Processor 236 may also be programmed to detect a range of motions. For example, processor 236 may be designed to compute motion lying within a fixed range of speed such as a range associated with people walking in front of the antenna. Thus, processor 236 can be designed to ignore motion by objects other than persons (e.g., birds or airplanes) which might otherwise cause the device to unnecessarily terminate transmission of communication signals. Conversely, if processor 236 detects an object such as a person within the selected range of antenna 112, processor 236 sends a signal ordering the transmitter to reduce or terminate power (see dashed line 238).

In a preferred embodiment, processor 236 is programmed to perform the time-delay selection function on delay line 220 (discussed above) to identify objects located within a designated range of antenna 112. Upon selecting the delay and receiving reflected power, processor 236 scans for signals having the designated power levels in designated frequency bands, which signals indicate the presence of objects close to the antenna. For example, for an object of a given size, the reflected signal power is proportional to the object's distance from antenna 112; thus, processor 236 can advantageously use the reflected signal strength to estimate the range of the object. Alternatively, or in addition, processor 236 can use the changing time delay of delay line 220 together with a spread spectrum signal of sufficient chip rate (or a non-spread spectrum signal of sufficient baud rate) to make a motion determination at a designated distance window.

Processor 236 preferably includes a decision circuit which, based on the motion of the object and its distance from antenna 112, determines whether the parameters of the received signals are indicative of a person moving in front of the beam. Where a person is detected, the decision circuit in processor 236 invokes an appropriate reduction or termination in antenna power (or triggers an alarm function).

Processor 236 can be realized in either hardware or software. Further,. processor 236 may be implemented by a variety of one or more digital signal processors, including, for example, a Lucent Electronics DSP 1620.

In all the foregoing it should be understood that the circuits described could perform other functions in addition to proximity detection. For example, RF equipment sometimes includes Voltage Standing Wave Ratio (VSWR) detectors for the purpose of detecting a damaged or missing antenna. The embodiments described here could perform that function in addition to the proximity detection function described, since a damaged or missing antenna would reflect back a large portion of the transmitted power (thereby causing a large VSWR) which would be detected by this invention in the same way as a reflection off a person.

It will also be understood that the foregoing is merely illustrative of the principles of the invention, and that various modifications and variations can be made by those skilled in the art without departing from the scope and spirit of the invention. The claims appended hereto are intended to encompass all such modifications and variations.

The invention claimed is:

1. A proximity detector for detecting objects in front of a high-frequency antenna used for communication, comprising:
   a high-frequency transmitter;
   a circulator connected to said transmitter;
   an antenna system, connected to said circulator, for sending communications signals;
   a signal detector, connected to said circulator, for detecting reflected energy.

2. The detector of claim 1, further comprising:
   a control circuit, connected to said signal detector and to said transmitter, for causing a reduction in power from said transmitter when a reflected signal having at least a predetermined magnitude is detected.

3. The detector of claim 2, wherein said transmitter comprises a power amplifier.

4. The detector of claim 3, wherein said power amplifier comprises a traveling wave tube amplifier.

5. The detector of claim 2, wherein said signal detector comprises a power meter.

6. The detector of claim 2, wherein said signal detector comprises a diode detector.

7. The detector of claim 2, wherein said control circuit causes the power from said transmitter to reduce to zero when a reflected signal having at least a predetermined magnitude is detected.

8. The detector of claim 2, wherein control circuit further initiates an alarm when a reflected signal having at least a predetermined magnitude is detected.

9. The detector of claim 1, further comprising:
   a control circuit, connected to said signal detector and to said transmitter, for initiating an alarm when a reflected signal having at least a predetermined magnitude is detected.

10. The detector of claim 9, wherein said signal detector comprises a power meter.

11. A proximity detector for detecting persons in front of a high-frequency antenna used for communication, comprising
   a power amplifier;
   a circulator connected to said power amplifier;
   a first filter, connected to said circulator, for attenuating out-of-band transmissions;
   an antenna, connected to said first filter, for sending communication signals;
   a second filter, connected to said circulator, for attenuating communication signals received from a remote source;
   a signal detector, connected to said filter, for measuring the magnitude of a reflected signal;
   a control circuit, connected to said signal detector and to said power amplifier, for initiating a reduction in signal power from said antenna when said signal detector detects a reflected signal of a magnitude indicating that a person is in front of said antenna.

12. The detector of claim 11, wherein said second filter comprises a band-pass filter.

13. The detector of claim 11, wherein said signal detector comprises a diode detector.

14. The detector of claim 11, wherein said signal power is reduced to zero when said signal detector detects a reflected signal of a magnitude indicating that a person is in front of said antenna.

15. The detector of claim 11, wherein said control circuit initiates an alarm when said signal detector detects a reflected signal of a magnitude indicating that a person is in front of said antenna.

16. The detector of claim 11, further comprising
   a transmitting element, connected to said power amplifier, for generating a high-frequency signal.

17. A proximity detector for detecting the presence of persons in front of a high-frequency communications antenna, comprising:
   a transmitting element comprising an input and an output;
   a circulator comprising three ports, said circulator having a first port which is connected to the output of said transmitter;
   an antenna system comprising an antenna and an input which is connected to a second port of said circulator;
   a regulator circuit comprising an input which is connected to the third port of said circulator and an output which is connected to the input of said transmitting element.

18. The detector of claim 17, wherein said regulator circuit is used for detecting the presence of a reflected signal and for initiating a reduction in power from said transmitting element when the magnitude of a reflected signal indicates a person in front of said antenna.

19. The detector of claim 18, wherein said regulator circuit initiates a reduction to zero in power from said transmitting element when the magnitude of a reflected signal indicates a person in front of said antenna.

20. The detector of claim 18, wherein said regulator circuit initiates an alarm when the magnitude of a reflected signal indicates a person in front of said antenna.

21. The detector of claim 17 wherein said regulator circuit is used for detecting the presence of a reflected signal and initiating an alarm when the magnitude of a reflected signal indicates a person in front of said antenna.

22. The detector of claim 17, wherein said regulator circuit comprises a signal detector and a control circuit.

23. The detector of claim 22, wherein said signal detector comprises a power meter.

24. The detector of claim 22, wherein said signal detector comprises a diode rectifier connected to a low-pass filter.

25. A proximity detector for detecting the presence of objects in front of a transmitting antenna used for communication, comprising:
   a transmitter for generating a high-frequency signal;
   a coupler, connected to said transmitter, for segmenting a small portion of the signal;
   a circulator, connected to said coupler, for transferring energy;
   a transmit filter, connected to said circulator, for attenuating noise;
   an antenna, connected to said transmit filter, for transmitting the signal;
   a splitter, connected to said circulator, for splitting a reflected signal; and
   a power meter, connected to said splitter, for detecting the magnitude of the reflected signal.

26. The detector of claim 25, further comprising
   a delay circuit connected to said coupler for generating a delayed version of the signal generated by said transmitter;
   a mixer connected to said delay circuit for mixing the delayed signal with the reflected signal;
   a gain stage circuit connected to said mixer and to said splitter;
   a filter connected to said mixer to prevent aliasing; and
   a processor, connected to said filter, for measuring the range of objects in front of said antenna to be detected.

27. The detector of claim 26, wherein said processor further comprises circuitry for detecting motion lying within a fixed range of speed.

28. A method for detecting the presence of objects in front of a high-gain antenna used for communication, comprising the steps of:
   emitting, from a transmitting element and into a first port of a circulator, a high-frequency communications signal;
   receiving the communications signal at a second port of the circulator;
   inputting the received communications signal into an antenna system which transmits the communication signal pursuant to a designated application;
   measuring the magnitude of a reflected signal received from a third port of the circulator; and
   initiating a reduction in power emitted from said transmitting element when the magnitude of the reflected signal indicates the presence of the object to be detected in front of the antenna.

29. The method of claim 28, wherein the object to be detected is a person.

30. The method of claim 28, wherein the magnitude of the reflected signal to be measured is power.

31. The method of claim 28, wherein the transmitting element comprises a power amplifier.

32. The method of claim 28, wherein the object to be detected comprises a damaged antenna.

33. A method of detecting an object in the transmission path of an antenna used for communication, comprising the steps of:
   emitting a high-frequency transmission signal into a first port of a multiport junction in which input signals at a first port appear at a subsequent second port and a second port input appears at a third port;
   transferring the high frequency transmission signal from the first port to the second port via the multiport junction for transmission;
   detecting reflected signals of an object at the second port and having the reflected signal appear at the third port;
   measuring a magnitude of the reflected signal at the third port;
   reducing transmit power if the magnitude of the reflected signal exceeds a threshold.

* * * * *